United States Patent
Fyson et al.

(10) Patent No.: US 7,501,071 B2
(45) Date of Patent: *Mar. 10, 2009

(54) METHOD OF FORMING A PATTERNED CONDUCTIVE STRUCTURE

(75) Inventors: John R. Fyson, Hackney (GB); Christopher B. Rider, New Malden (GB)

(73) Assignee: Eastman Kodak Company, Rochester, NY (US)

( * ) Notice: Subject to any disclaimer, the term of this patent is extended or adjusted under 35 U.S.C. 154(b) by 217 days.

This patent is subject to a terminal disclaimer.

(21) Appl. No.: 11/365,050

(22) Filed: Mar. 1, 2006

(65) Prior Publication Data

US 2007/0269589 A1 Nov. 22, 2007

(30) Foreign Application Priority Data

Mar. 2, 2005 (GB) .................................. 0504262.7

(51) Int. Cl.
*B44C 1/22* (2006.01)
*H01L 21/302* (2006.01)

(52) U.S. Cl. ........................ 216/41; 216/74; 438/708; 438/720; 438/725; 438/736

(58) Field of Classification Search ................ 438/708, 438/720, 725, 736; 216/41, 74
See application file for complete search history.

(56) References Cited

U.S. PATENT DOCUMENTS

| 5,716,758 A * | 2/1998 | Bae et al. ..................... 430/312 |
| 6,774,965 B2 | 8/2004 | Nakashima et al. |
| 6,777,036 B2 * | 8/2004 | Bravo Vasquez et al. ..... 427/533 |
| 6,939,475 B2 * | 9/2005 | Satoh et al. ................... 216/47 |
| 7,361,379 B2 * | 4/2008 | Fyson et al. ................. 427/108 |
| 2002/0025391 A1 * | 2/2002 | Angelopoulos et al. ...... 428/1.4 |
| 2003/0043316 A1 * | 3/2003 | Matsumoto et al. ........... 349/84 |
| 2006/0199362 A1 * | 9/2006 | Fyson et al. ................. 438/597 |

* cited by examiner

*Primary Examiner*—Binh X Tran
(74) *Attorney, Agent, or Firm*—Roland R. Schindler

(57) ABSTRACT

A method of producing a patterned mirror on a transparent conductive substrate comprises the steps of; coating a layer of conductive material onto a substrate, coating a layer of metal onto the layer of conductive material, coating a layer of photoresist onto the layer of metal, curing the layer of photoresist, exposing a desired pattern of transparent conductors through a first mask onto the layer of photoresist, developing the photoresist and simultaneously etching the layer of the conductive material and the layer of metal, exposing a desired pattern of metal conductors through a second mask onto the remaining layer of photoresist, developing the photoresist and etching the layer of metal.

6 Claims, 1 Drawing Sheet

ITO ETCH LINES FROM PREVIOUS STAGE
REGISTERED WITH THESE LINES

ITO ETCH LINES REGISTERED WITH CELL
GAPS IN NEXT STAGE

ITO ETCH LINES FROM PREVIOUS STAGE
REGISTERED WITH THESE LINES

METHOD OF FORMING A PATTERNED CONDUCTIVE STRUCTURE

CROSS-REFERENCE TO RELATED APPLICATIONS

This application is based on GB Application Serial No. 0504262.7 filed Mar. 2, 2005.

FIELD OF THE INVENTION

This invention relates to display devices, in particular to a method of manufacturing a patterned conductive structure for controlling the application of a voltage to the device.

BACKGROUND OF THE INVENTION

Digital pixelated non-emissive displays require conductive tracks running to the electrodes at every pixel to address the display. The display can be transparent and lit from behind or rely on a reflector on one side, using ambient light to view the device. In the case of displays which are illuminated from behind, the tracks carrying the current must be substantially transparent over the viewing area. They may be made of an organic conductor such as polythiophene, a derivative of polythiophene, which may be mixed with other components or an inorganic conductor such as indium tin oxide (ITO). The track and electrode pattern may be formed in any suitable manner such as photolithography and then etched with a suitable etchant. However, these 'conductive' materials have a relatively large resistance when used to form transparent conductors and this resistance will impair the operation of a display, especially if the display is large.

A means of overcoming this is to put a conducting metal over part of these tracks to reduce the resistance. This reduces the light passing through the pixels. The area covered by the metal is kept to a minimum. If the display is backlit, the effect of the metal conductors can be partially overcome by making them reflective. Any light hitting the metal conductor would then be reflected back into the light box or light guide instead of being absorbed.

In the case of a light box, it is necessary that the metal conductor be highly reflective but not necessarily highly specular. However, to reduce the thickness of the display, especially, for example, in portable high resolution displays, it is common practice to use edge lighting of a planar wave guide structure which is designed to leak some of the light from one side of the light-guide and uniformly illuminate the display. In this case it is important that the reflection from the metal conductor be specular to avoid breaking the wave guiding conditions and causing light leakage which would reduce both the efficiency and the uniformity of the backlight. Therefore, a reflective metal conductor with a good mirror finish on the ITO substrate would be advantageous in both cases. This metal is often coated by vacuum deposition or sputtering and then subsequently laser etched. This process is slow and requires the formation of a good vacuum around the material. This puts a limit on the practical size of rigid transparent substrates such as glass or requires a rolled up flexible substrate to be rolled and unrolled within the vacuum.

U.S. Pat. No. 6,774,965 discloses a combination of metal and transparent conductors. This document teaches the use of ITO as the transmissive electrode and the use of a top metallic reflective conductor to reflect light from the surroundings to give a transflective display. U.S. Pat. No. 6,774,965 does not teach the use of the metallic conductor to reflect light back into the light box behind the display and indeed creates structure behind the reflecting electrodes that absorb light. The method of manufacture is consecutive and new resist steps, dry or wet are implied at each stage.

PROBLEM TO BE SOLVED BY THE INVENTION

The invention aims to provide a simplified method of reducing the resistance of a transparent component of a display device, for instance an address plate, by the addition of a metallic conductor and reducing the amount of light absorbed by the metallic conductors.

SUMMARY OF THE INVENTION

According to the present invention there is provided a method of producing a patterned mirror on a transparent conductive substrate comprising the steps of, coating a layer of conductive material onto a substrate, coating a layer of metal onto the layer of conductive material, coating a layer of photoresist onto the layer of metal, curing the layer of photoresist, exposing, through a first mask, a desired pattern of transparent conductors onto the layer of photoresist, developing the photoresist and simultaneously etching the layer of the conductive material and the layer of metal, exposing, through a second mask, a desired pattern of metal conductors onto the remaining layer of photoresist, developing the photoresist and etching the layer of metal. Preferably the substrate is flexible.

ADVANTAGEOUS EFFECT OF THE INVENTION

The method of the present invention allows a layer of photoresist to be used more than once. The same layer of photoresist is used in etching both the transparent and metal conductor patterns. This simplifies the method of manufacture and is more efficient and cost effective. Furthermore it reduces coating errors as only one coating of photoresist is required.

BRIEF DESCRIPTION OF THE DRAWINGS

The invention will now be described with reference to the accompanying drawings in which.

DETAILED DESCRIPTION OF THE INVENTION

Figure 1:
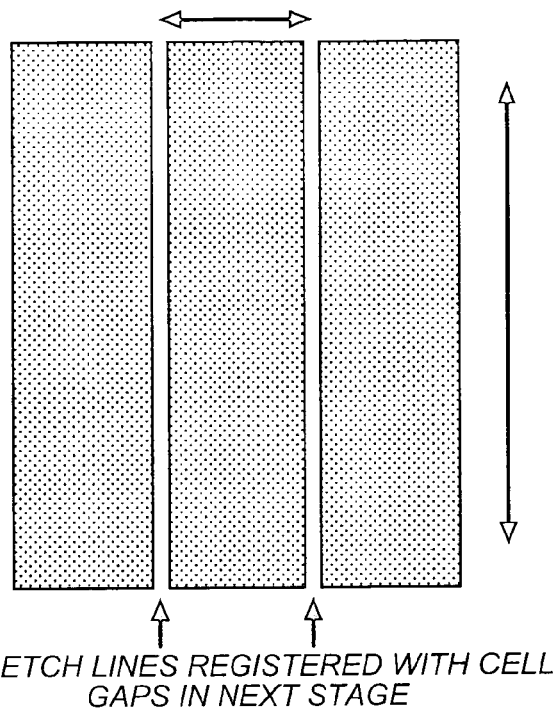
FIG. 1 illustrates the conductive layer etch mask.

The conductive structure manufactured in accordance with the invention comprises a substrate over which is coated a layer of conductive material. The substrate is preferably transparent. The material forming the conductive layer is preferably inorganic. However this is not an essential feature of the invention. A suitable material for the conductive layer is indium tin oxide (ITO). It will be understood by those skilled in the art that this is an example only and that any suitable material may be used for the conductive layer, e.g. PEDOT (polythiophene or polyandene). A layer of metal mirror is then coated over the conductive layer by vacuum deposition or traditional chemical mirroring techniques. This layer of metal reduces the electrical resistance of the layer of conductive material. The metal may be silver but it will be understood by those skilled in the art that any suitable metal may be used. A layer of positive photoresist is then coated above the metal layer.

The layer of photoresist is cured and then exposed through a mask to the desired pattern of the transparent conductors. The resist is subsequently developed. Where light has shone onto the photoresist it becomes soft and is removed. An etchant is then applied which removes the exposed areas of both the metal layer and the conductive layer. Suitable etchants that would etch both the metal layer and the conductive layer would be any oxidising acidic etch such as dilute chromic acid or acid permanganate. These are examples only and the person skilled in the art will understand that any suitable etchant may be used. After the etching is complete a pattern of transparent conductors are left on the substrate. At this stage they are topped with a layer of metal.

The remaining layer of photoresist is then exposed, through a second mask, to the desired pattern of the metal mirror conductors. The mask can be registered with the metal strips left by the first etching to ensure accurate positioning. More of the photoresist layer becomes soft and is removed. A further etchant is applied which removes the exposed part of the metal layer. This further etching results in the removal of the layer of metal from the top of some of the conductors. This allows light to travel through the conductive layer at these areas. A different etchant is generally used after this second exposure to ensure that the conductive layer is not further etched as well as the metal layer. An example would be a mixture of iron (III) EDTA and a metal complexing agent. However, a fast acting etchant could be used on the metal for a short time such that the transparent conductive layer is not significantly etched at this point. The remaining resist may he removed it this stage.

The structure obtained by the method described above can be used in any transmissive display device in which conductive tracks are required, for example a backlit liquid crystal display device.

A description of an enabling embodiment follows:

EXAMPLE

Coating

This was a 0.2 micron evaporated silver coated onto 300 ohms/sq ITO on 175 micron transparent PET support. All work was carried on pieces cut to 200×150 mm.

Equipment

Exposure

A RS Components Ltd UV Exposure Unit was used with a sheet of film cassette velvet behind the sample to reduce scatter and improve contact. A timer was used as required. For times less than 30 s the clockwork timer was set for greater than 1 minute and the mains switch operated for the desired time. The lamp took approximately 1 second to come on. This was used as a correction factor for short times.

Coating

The coating was carried out on a spirally wound bar coater made by RK Coater Ltd having a coating width of approximately 300 mm. This used a 300×150 mm sheet of smooth cleaned aluminium about 1 mm thick which was taped with masking tape to the soft Estar coating onto the mat of the coater such that the long axis was parallel to the coating direction. The samples were taped to this. The height of the coating roller was set by eye—an inspection lamp was placed behind the required roller and the micrometers adjusted until the roller just touched the sample across the width.

Oven

A standard 'hotbox' oven set at 50° C. was used. Two hours were allowed for stabilisation.

Registration

The masks were registered visually on a 12"×12" light box with a Wratten 2C on the top to remove UV light. A simple 'linen tester' was used to provide magnification.

| Solutions | |
|---|---|
| Silver and ITO etch | |
| potassium dichromate | 1 g |
| sulphuric acid | 100 g |
| water to | 1 liter |
| Silver Etch | |
| 1.56moler ammonium iron (III) EDTA solution | 90 ml |
| ammonium thiosulphate | 50 g |
| acetic acid, glacial | 5 ml |
| water to | 1 liter |
| Resist Developer | |
| sodium hydroxide | 10 g |
| water to | 1 liter |
| Rinse | |
| Kodak Photoflo | 0.5 ml |
| water to | 1 liter |

Resist

RS Components Ltd Aerosol Photoresist (positive working). This was coated using the coater described above. To obtain the liquid resist, the aerosol was sprayed into a sample tube of 5-10 ml and allowed to stand to warm up and allow the propellant to boil off before coating. This took about 20 minutes. To this was added 0.5% by weight a fluorosurfactant Modiper F-600™ (manufactured by NOF CORPORATION) NB. One coating was used for both ITO and then silver etching without a recoat using the positive resist.

Making Silver Bus Bars on ITO Conductors

RS Resist Coating

To the aluminium sheet on the coater (see above) was taped, at both ends, the silver on ITO coating such that the long axis was parallel to the coating direction. A 12 micron coating bar was attached and the micrometers set so that the bar just touched the coating. The bar was moved to the tape at the far end of the coating. RS resist (about 0.5 ml) was applied to the coating on the edge of the roller (on the side of the coating direction) with a pipette. The bar was then driven at about 50 mm/s. The coating was allowed to dry in the dark and was then put in the oven for 60 minutes. The coating was allowed to cool in the dark after being taken from the oven. The coating was handled in the dark or subdued tungsten light until exposure.

ITO Etching (Also Removes Silver Over the Top of the ITO)

The coating was exposed to the ITO etch mask, see FIG. 1, centring the coating first. This mask was made by laser exposing a computer drawn image onto high contrast graphic arts material and then processing it in the usual way. The order of the pack when exposing the resist was exposing box/mask/coating (resist side to mask)/black velvet/lid. The lid was closed to ensure good contact. Exposure was for 90 seconds.

The coating was then removed and developed in the developer in a processing dish for 90 s at 21° C. The coating was washed in cold running water in another processing dish for 30 s. The coating was then processed in ITO etch for 240 s at 21° C. before washing again for 30 s. The coating was washed in distilled water and hung up to dry after dabbing with a paper towel.

Figure 2:
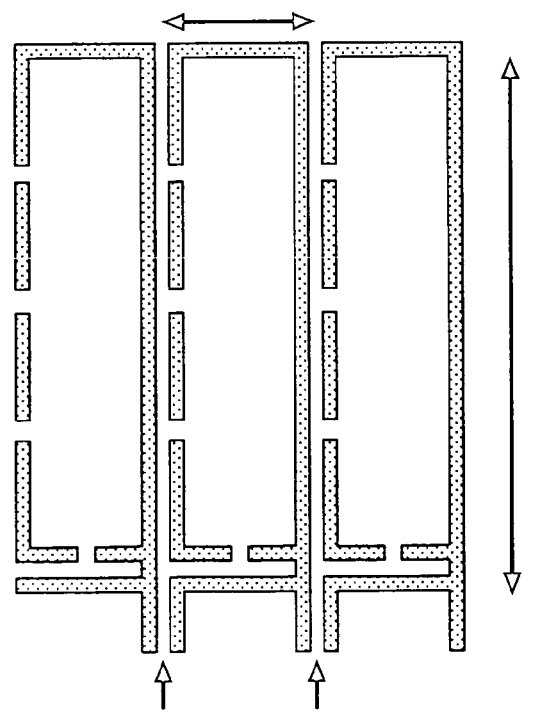
FIG. 2 illustrates the metal layer etch mask.

The resist was used again without recoating. The coating was exposed to a silver etch mask, see FIG. 2, registering this with the previous image using sticky tape to hold the registration. This mask was also made by laser exposing a computer drawn image onto high contrast graphic arts material and then processing it in the usual way. The order of the pack when exposing the resist was exposing box/mask/coating (resist side to mask)/black velvet/lid. The lid of the exposing box was closed to ensure good contact. Exposure was for 50 seconds.

The coating was then removed and developed in the developer in a processing dish for 90 s at 21° C. The coating was washed in cold running water, aiming a jet at the coatings to assist resin removal. The coating was then processed in silver etch for 40 s at 21° C. before washing again for 30 s. The coating was washed in rinse and hung up to dry after dabbing with a paper towel. The remaining resist was removed by washing in three changes of acetone.

The invention has been described in detail with reference to preferred embodiments thereof. It will be understood by those skilled in the art that variations and modifications can be effected within the scope of the invention.

The invention claimed is:

1. A method of producing a patterned mirror on a transparent conductive substrate comprising the steps of:
    coating a layer of conductive material onto a substrate;
    coating a layer of metal onto the layer of conductive material;
    coating a layer of photoresist onto the layer of metal;
    curing the layer of photoresist;
    exposing the layer of photoresist through a first mask to produce a desired pattern of transparent conductors on the layer of photoresist;
    developing the layer of photoresist;
    simultaneously etching the layer of the conductive material and the layer of metal to transfer the desired pattern of transparent conductors to the layer of conductive material, thereby forming transparent conductors;
    exposing portions of the layer of photoresist that remain through a second mask to produce a desired pattern of metal conductors on remaining portions of the layer of photoresist; and
    developing the remaining portions of the layer of photoresist and etching the layer of metal to transfer the desired pattern of metal conductors to the layer of metal, thereby forming metal conductors.

2. A method as claimed in claim 1, wherein the metal is silver.

3. A method as claimed in claim 1, wherein the substrate is flexible.

4. A method as claimed in claim 1, wherein the conductive material is comprised of an inorganic material.

5. A method as claimed in claim 1, wherein the second mask is registered with the transparent conductors.

6. A method as claimed in claim 1, wherein etching of the layer of metal to form the metal conductors uses a different etchant than that used to simultaneously etch the layer of conductive material and the layer of metal to form the transparent conductors.

* * * * *